United States Patent Office 3,007,945
Patented Nov. 7, 1961

3,007,945
PROCESS AND INTERMEDIATES FOR PREPARING 6-DEHYDROMETHYLTESTOSTERONE
Josef Fried and Josef E. Herz, New Brunswick, N.J., assignors to Olin Mathieson Chemical Corporation, New York, N.Y., a corporation of Virginia
No Drawing. Filed Apr. 2, 1957, Ser. No. 650,087
7 Claims. (Cl. 260—397.4)

This invention relates to the synthesis of valuable steroids and has for its objects the provision of: (I) an advantageous process of preparing 6-dehydromethyltestosterone (17α-methyl-$\Delta^{4,6}$-androstadiene-17β-ol-3-one); (II) the 6β-alkanesulfonic acid esters of 6β-hydroxymethyltestosterone (e.g., 17α-methyl-$\Delta^4$-androstene-6β,17β-diol-3-one 6β-mesylate) useful as intermediates in the preparation thereof; and (III) the steroid itself which is new and useful.

The process of this invention essentially comprises: (a) converting 6β-hydroxymethyltestosterone (17α-methyl-$\Delta^4$-androstene-6β,17β-diol-3-one) into the corresponding 6β-organicsulfonyloxy derivative; and (b) converting the latter into 6-dehydromethyltestosterone. These conversions are effected by interacting 6β-hydroxymethyltestosterone [Eppstein et al., J. Am. Chem. Soc. 76, 3174 (1954)], with an alkane-sulfonyl halide or aromatic sulfonyl halide (sulfonyl chlorides are preferred, but other halides such as bromides and iodides may be used). Although any alkanesulfonyl chloride may be used, the alkane group is preferably a lower alkane, methane-sulfonyl chloride (mesyl chloride) being particularly preferred. Suitable aromatic sulfonyl halides include the hydrocarbon aryl sulfonyl chlorides as exemplified by tosyl chloride. The reaction is carried out by intermixing the steroid and sulfonyl halide under substantially anhydrous conditions and preferably in the cold (e.g., at a temperature less than about 20° C.) in the presence of pyridine or other organic base.

The sulfonic acid ester thus formed is then desulfonated by treating with a basic reagent (e.g., potassium fluoride) in an organic solvent (e.g., dimethylsulfoxide). This reaction is preferably conducted at an elevated temperature.

The 6-dehydromethyltestosterone thus formed is a new compound which possesses androgenic activity when administered perorally. Thus, it may be used in lieu of known androgens, such as methyltestosterone, in the treatment of menopausal disorders.

The following examples are illustrative of the invention (all temperatures being in centigrade):

EXAMPLE 1

*6β-hydroxytestosterone 6-mesylate*

To an ice-cold solution of 100 mg. of 6β-hydroxymethyltestosterone in 1.5 ml. of anhydrous pyridine is added 0.15 ml. of methanesulfonyl chloride. After 3 hours at 0°, water is added and the mixture extracted with chloroform. The chloroform solution is washed with water, dilute acid to remove the pyridine, sodium bicarbonate and finally with water. The solution is dried over sodium sulfate and evaporated to dryness in vacuo. The crystalline residue after recrystallization from acetone-hexane represents pure 6β-hydroxymethyltestosterone 6-mesylate melting at about 115–117° (dec.).

In a similar manner, by substituting ethanesulfonyl chloride or tosyl chloride for the methanesulfonyl chloride in the procedure of Example 1, the 6β-ethanesulfonate and 6β-p-toluenesulfonate are formed, respectively.

EXAMPLE 2

*6-dehydromethyltestosterone*

To a solution of 83 mg. of 6β-hydroxymethyltestosterone 6-mesylate in 10 ml. redistilled dimethylsulfoxide is added 100 mg. of potassium fluoride and the mixture heated with stirring at 110° (bath temperature) for 18 hours. After cooling, the reaction mixture is diluted with water and the steroids extracted into chloroform. The chloroform extract is washed with water, dried over sodium sulfate and evaporated to dryness in vacuo. The residual gum is dissolved in 4 ml. of benzene and 4 ml. of hexane and chromatographed on 2 grams of acid-washed alumina. Elution with benzene-hexane (1:1, 400 ml.) furnishes a crystalline fraction, consisting of 6-dehydromethyltestosterone, which after recrystallization from acetone-hexane has the following properties: M.P. about 192–194°;

$\lambda^{alc}_{max.}$ 2.84 m$\mu$ ($\epsilon$=25,000); $\lambda^{Nujol}_{max.}$ 2.92, 6.05, 6.20, 6.34$\mu$

*Analysis:*—Calculated for $C_{20}H_{28}O_2$ (300.42): C, 79.95; H, 9.39. Found: C, 79.67; H, 9.05.

The invention may be otherwise variously embodied within the scope of the appended claims.

We claim:
1. A 6β-alkanesulfonic acid ester of 6β-hydroxymethyltestosterone.
2. 6β-hydroxymethyltestosterone 6β-mesylate.
3. A process for preparing 6-dehydromethyltestosterone which comprises interacting a 6β-organicsulfonic acid ester of 6β-hydroxymethyltestosterone with potassium fluoride.
4. The process of claim 3 wherein the ester is the mesylate.
5. A process for preparing a 6β-organicsulfonic acid ester of 6β-hydroxymethyltestosterone which comprises interacting 6β-hydroxymethyltestosterone with an organicsulfonyl halide in the presence of an organic base.
6. The process of claim 5 wherein the sulfonyl halide is an alkanesulfonyl chloride.
7. A process for preparing 6β-hydroxymethyltestosterone 6β-mesylate which comprises interacting 6β-hydroxymethyltestosterone with mesyl chloride in the presence of pyridine.

References Cited in the file of this patent
UNITED STATES PATENTS

| | | |
|---|---|---|
| 2,686,791 | Murray | Aug. 17, 1954 |
| 2,739,974 | Colton | Mar. 27, 1956 |
| 2,763,671 | Fried | Sept. 18, 1956 |